(12) United States Patent
Vasilyev et al.

(10) Patent No.: US 7,505,690 B2
(45) Date of Patent: Mar. 17, 2009

(54) MULTI-CHANNEL ALL-OPTICAL SIGNAL PROCESSOR

(76) Inventors: Michael Vasilyev, 8409 Buxton Ct., Plano, TX (US) 75025; Taras L. Lakoba, 125 Kennedy Dr., Apt. 9, South Burlington, VT (US) 05403

(*) Notice: Subject to any disclaimer, the term of this patent is extended or adjusted under 35 U.S.C. 154(b) by 388 days.

(21) Appl. No.: 11/045,913

(22) Filed: Jan. 28, 2005

(65) Prior Publication Data

US 2006/0171716 A1    Aug. 3, 2006

(51) Int. Cl.
*H04B 10/16* (2006.01)
*H04J 14/02* (2006.01)
(52) U.S. Cl. ............... 398/175; 398/79; 398/97; 398/173; 398/178; 398/179; 398/180
(58) Field of Classification Search ........... 398/147, 398/158–161, 173–181, 79, 97
See application file for complete search history.

(56) References Cited

U.S. PATENT DOCUMENTS

| | | | | |
|---|---|---|---|---|
| 6,141,129 | A * | 10/2000 | Mamyshev | 398/180 |
| 2004/0208428 | A1 * | 10/2004 | Kikuchi et al. | 385/24 |
| 2004/0208610 | A1 * | 10/2004 | Grosz et al. | 398/148 |
| 2006/0067704 | A1 * | 3/2006 | Fishman et al. | 398/161 |
| 2007/0065159 | A1 * | 3/2007 | Kuksenkov et al. | 398/175 |

OTHER PUBLICATIONS

Her et al: "Enhanced 40-Gbit/s Receiver Sensitivity with All-fiber Optical 2R Regenerator", CLEO 2002, pp. 534-535.*
Pincemin et al: "Feasibility of 1 Terabit/s (25×40 Gbit/s) transoceanic optically-regenerated systems", Optics Letters, vol. 24, No. 11, pp. 720-722.*
Wei et al: "Reduction of collision-induced timing jitter in dense wavelength-division multiplexing by the use of periodic-group-delay dispersion compensators", Optics Letters, Jun. 15, 2003, vol. 28, No. 12, pp. 983-985.*
Raybon et al: "40 Gbit/s Pseudo-linear Transmission Over One Million Kilometers", OFC 2002, pp. FD10-1-FD10-3.*
Ohara et al: "40-Gb/s ×4-Channel All-Optical Multichannel Limiter Utilizing Spectrally Filtered Optical Solitons", IEEE Photonics Technology Letters, vol. 15, No. 5, May 2003, pp. 763-765.*

(Continued)

*Primary Examiner*—Kenneth N Vanderpuye
*Assistant Examiner*—Li Liu
(74) *Attorney, Agent, or Firm*—Chowdhury & Georgakis, PC

(57) ABSTRACT

An all-optical processor and method for simultaneous 2R regeneration of the multiple wavelength-division-multiplexed (WDM) channels comprising: a nonlinear medium, wherein the nonlinear medium comprises one or more highly-nonlinear fiber (HNLF) sections adapted to receive multiple WDM channels from the input, and wherein further the HNLF sections are separated by one or more periodic-group delay devices (PGDDs). The all-optical processor may also include one or more amplifiers adapted to receive the multiple WDM channels; one or more de-interleavers adapted to separate the WDM channels into one or more sets of WDM channels, one or more optical band-pass filters to filter the channels received from the amplifier; one or more optical band-pass filters to filter the channels received from the non-linear medium; and one or more interleavers to receive the filtered channels from the periodic band-pass filter and to combine the sets of WDM channels into an output.

24 Claims, 3 Drawing Sheets

OTHER PUBLICATIONS

P.V. Mamyshev, ECOC '98, pp. 475-476 (Sep. 20-24, 1998).
Y. Su et al, IEEE Photon Tech Lett, 15(2): 350-352 (2003).
M. Matsumoto et al, J. Lightwave Tech, 22(6):1472-1482 (2004).
N. Yoshikane et al, Electron Lett, 39(24):1570-1572 (2003).
T. Ohara et al, IEEE Photon Tech Lett, 15(5):763-765 (2003).
C. Madsen, IEEE Photon Tech Lett, 11(12):1623-1625 (1999).
C. Doerr et al, OFC 2002, paper PDFA6, pp. 2-4 (2002).
L. Moellenauer et al, Opt Lett, 28(21): 2043-2045.
Leclerc et al, 2002, Optical Fiber Telecommunications, Chapter 15, vol. IVA, pp. 733-783.
Vasilyev, Michael, et al., "All optical multichannel 2R regeneration in a fiber-based device," Optics Letters, V-30, No. 12, Jun. 15, 2005, 1458-60.
Vasilyev, M., et al., "Fiber-based all-optical 2R regeneration of multiple WDM channels," OME62, Optical Society of America, March 6, 2005, 3 pp.

O. Leclerc, et al., Simultaneously regenerated 4×40 Gbit/s dense WDM transmission over 10,0000 km using single 40 GHz InP Mach-Zehnder modulator, Electronics Letters, Aug. 31, 2000, vol. 36, pp. 1574-1575.
G. Belotti, et al., 10×10 Gb/x cross-phase modulation suppressor for multispan transmissions using WDM narrow-band fiber Bragg gratings, IEEE Photonics Technology Letters, Oct. 2000, vol. 12, pp. 1043-1045.
G. Raybon, et al., 40 Gbit/s pseudo-linear transmission over one million kilometers, OFC 2002, Post deadline paper FD10, pp. FD10-1 to FD10-3.
X. Wei, et al., Reduction of collision-induced timing jitter in dense wavelength-division multiplexing by the use of periodic-group-delay dispersion compensators, Optics Letters, Jun. 15, 2003, vol. 28, pp. 983-985.

* cited by examiner

MULTI-CHANNEL ALL-OPTICAL SIGNAL PROCESSOR

BACKGROUND

The present invention relates to the general field of communication systems, and, in particular, to all-optical signal processors.

Currently, optical communication links are the preferred means of data transmission. Optical communication links have tremendous multi-terahertz bandwidth which allows transmission over, for example, several meters to transoceanic distances. The rapid accumulation of various propagation impairments (e.g., fading, scattering, diffraction of free-space optical connections, amplified spontaneous emissions, chromatic and polarization-mode dispersions and crosstalk for fiber-optic links), however, requires frequent termination of optical communication links by optical detectors, so that the signals are electronically regenerated and retransmitted by modulated laser sources. This so-called opto-electro-optical (OEO) regeneration is complex, bulky and extremely expensive. OEO regeneration for high-capacity optical links containing multiple wavelength-division-multiplexed (WDM) channels requires separate regenerators for each channel, and is thus especially complex and expensive.

Recent progress in high-speed detectors, optical amplifiers and modulation formats has enabled the un-regenerated reach distances of up to several thousand kilometers. Such long-haul transmission has been largely confined to point-to-point links which often times require OEO regeneration at the terminals interconnecting the links into the network. OEO regeneration is required after long-distance propagation because the signals lack the performance margin needed to accommodate considerable penalties such as crosstalk, polarization-dependent loss and spectral clipping by filters from multiple network elements used for switching and routing. In order to eliminate costly OEO regeneration, those skilled in the art have incorporated limited optical networking capabilities into the links (e.g., by means of optical add-drop multiplexers and cross-connects). However, without regeneration such measures cause dramatic reductions in the flexibility and scalability of the network and greatly increase the complexity of system management.

On the other hand, all-optical regeneration has been recognized as a potential enabler of future ultra-long reach high-bit-rate systems and all-optical packet-switched networks. All-optical regenerators with re-amplification and re-shaping (2R) capabilities have attracted particular attention because of their simplicity and robustness. In order to qualify as a viable alternative to current systems, all-optical regenerators must be easily scalable with the number of WDM channels. However, simultaneous multi-channel regeneration remains a formidable challenge because the operation of an all-optical regenerator fundamentally relies on strong nonlinear-optical effects which lead to debilitating interaction among the WDM channels, in particular by way of four wave mixing (FWM) and cross-phase modulation (XPM).

The operating principle of a single-channel 2R regenerator of the prior art is illustrated in FIG. 1, where: (1) dashed line is an input spectrum; (2) bold solid line is the self-phase modulation (SPM) broadened spectrum; and (3) dotted line with gray shading is the output spectrum selected by off-center filter. When an optical pulse (full bandwidth at half maximum $\Delta v_0$) propagates through a nonlinear Kerr medium, such as highly nonlinear fiber (HNLF), its Fourier spectrum is broadened to width $\Delta v_{NL}$ by the effect of SPM. For sufficiently large spectral broadening (i.e. when $\Delta v_{NL} >> \Delta v_0$, the output bandwidth $\Delta v_{NL}$ becomes approximately proportional to the input pulse power $P_0$: $\Delta v_{NL} \propto P_0$. Therefore, the output spectral density, $P_0/\Delta v_{NL}$ becomes almost independent of the input power. By selecting a portion of the output spectrum with a narrow optical bandpass filter (OBPF), one produces the output pulses with relatively constant power independent of fluctuations of $P_0$. This achieves regeneration of ONEs (note that the shape and duration of the output pulses are completely determined by the shape and bandwidth of the OBPF). In addition, the power of any (unwanted) electric field that accumulates in ZERO bit slots due to various transmission impairments and noise, is much smaller than the power of ONEs. Thus, this field propagates in a virtually linear regime and does not experience spectral broadening. Therefore, it is easily rejected by the OBPF that is sufficiently shifted from the input spectrum's center.

While the presence of non-zero dispersion in the fiber is not critical for the regeneration to occur, the regenerator's performance is improved in the presence of small negative dispersion which helps to flatten the ripples in the SPM-broadened spectrum.

In the case of multiple channels propagating in the nonlinear medium, however, the benefits of the 2R regeneration are overshadowed by enormous degradations coming from non-linear interactions among the WDM channels, such as FWM and XPM. As a result, the prior art has failed to achieve the simultaneous 2R regeneration of multiple WDM channels.

While the cost, size and power consumption advantages of an all-optical regenerator are widely recognized for both fiber-based and free-spaced systems, prior art designs fail to meet that need. Prior art regenerators are single-optical-channel devices implemented on a channel-by-channel basis and are thus precluded from use in real networks.

What is needed therefore is an effective, cost-efficient method and system for deploying fully scalable and fully flexible all-optical networks that enable simultaneous processing of multiple WDM channels without converting them to the electrical domain.

SUMMARY OF THE INVENTION

The present invention overcomes the aforementioned limitations in an effective and efficient manner and provides, for example, expanded use of all-optical regeneration. The present invention enables simultaneous regeneration of multiple optical WDM channels without demultiplexing to a single channel level. The regenerative function of the present invention is enabled by the third-order optical susceptibility (Kerr nonlinearity). By processing multiple channels at the same time, the multi-channel all-optical signal processor or regenerator 10 of the present invention offers significant reductions in cost, complexity, size and power consumption when compared to OEO regenerators known in the art. Moreover, the present invention provides substantially better performance and dramatically increases the reliability and robustness of such systems. Thus, the all-optical regeneration and processing capabilities of the present invention enable the deployment of, for example, fully scalable and fully flexible circuit-, burst-, and packet-switched networks at a fraction of their current capital, operating, and end-user costs.

The present invention provides systems and methods for multi-channel operation and regeneration that may be applied to other all-optical signal processing devices, such as wavelength converters, limiters, time-division-multiplexers, etc.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
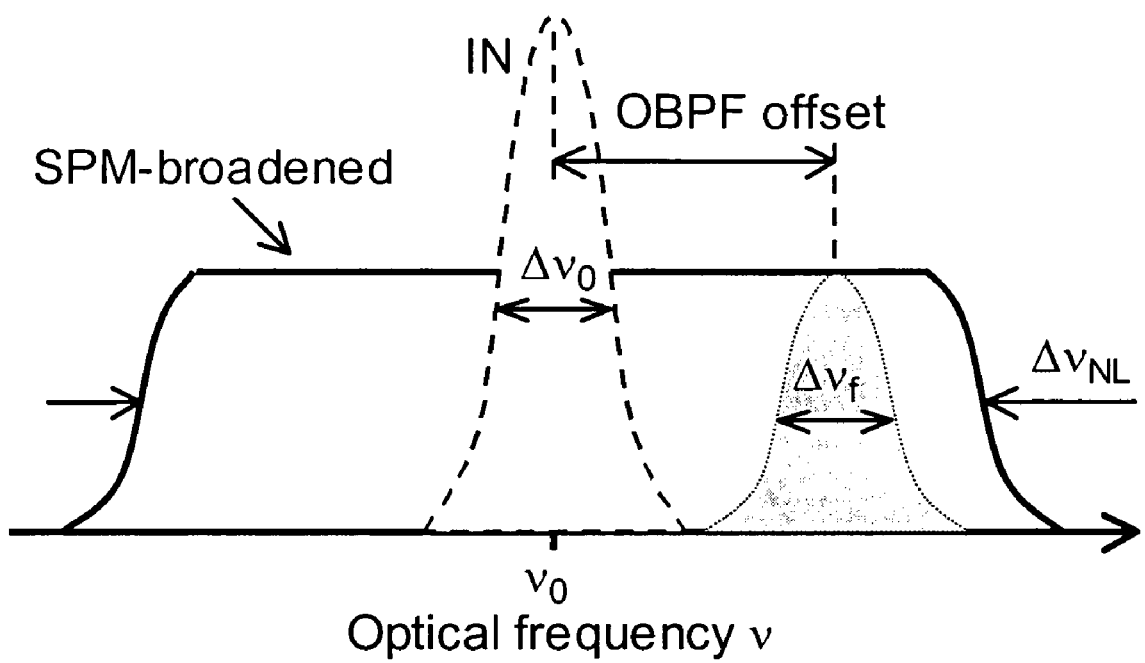
FIG. 1 is an illustration of the regeneration by spectral filtering of the SPM-broadened spectrum of the prior art.
Figure 2:
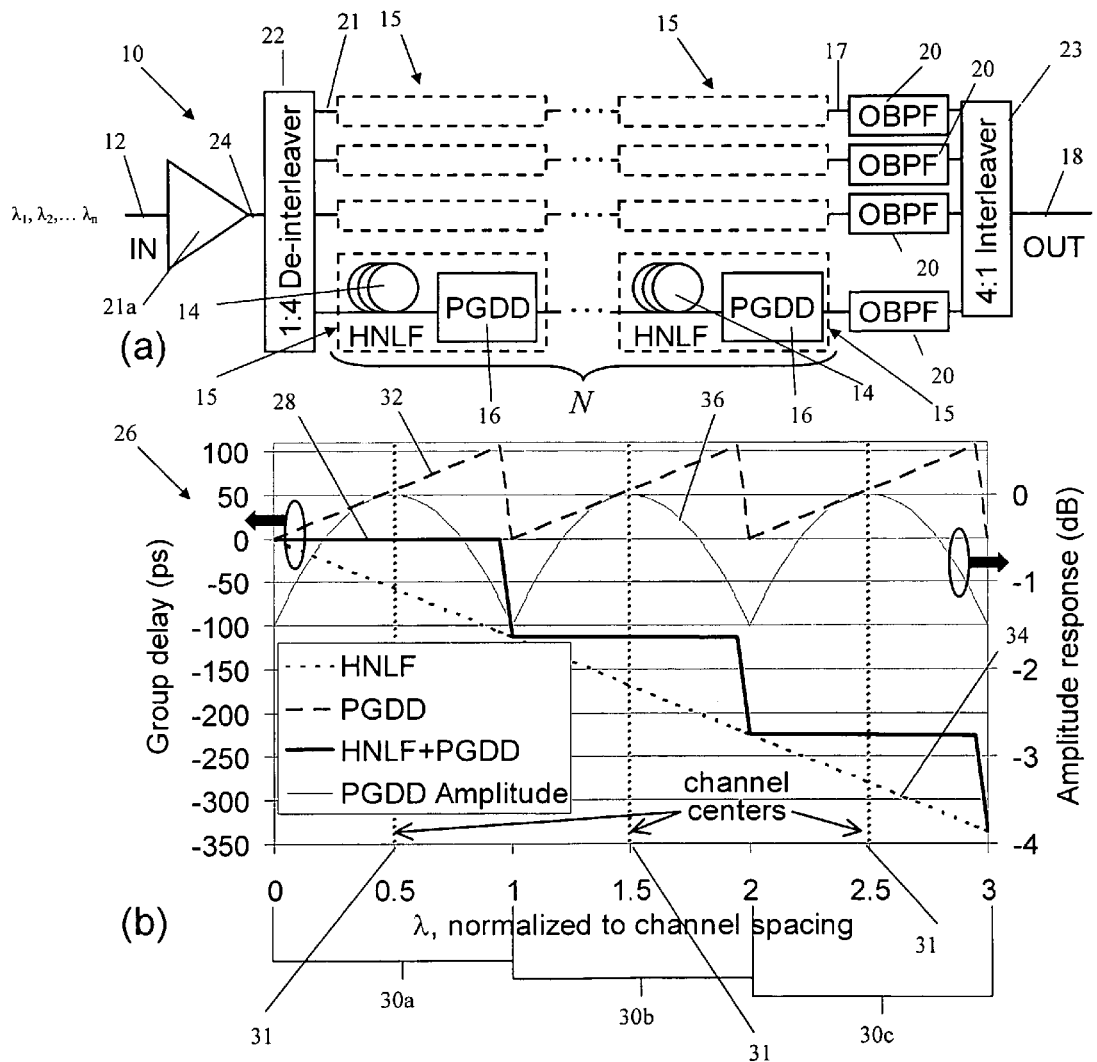
FIG. 2A is an illustration schematic of the multi-channel all-optical signal processor of the present invention.
FIG. 2B is a group delay spectrum of a unit section of a non-linear medium.

FIG. 2A is an illustrative schematic of the multi-channel dispersion-managed regenerator 10 of the present invention. The all-optical re-amplification and re-shaping (2R) regenerator 10 of the present invention is capable of simultaneous regeneration of multiple wavelength-division-multiplexed (WDM) channels 12 (center wavelengths $\lambda_1, \lambda_2 \ldots \lambda_n$) while avoiding interchannel penalties, so that both four-wave-mixing (FWM) and cross-phase modulation (XPM) are suppressed without requiring any polarization control.

The regenerator 10 of the present invention comprises multiple unit sections 15 of non-linear media (each depicted in FIG. 2A as a section of highly non-linear fiber (HNLF) 14 with high normal dispersion, followed by a dispersion-compensating periodic-group-delay device (PGDD) 16). At the output 17 of the last unit section 15 of nonlinear medium, a spectrally-periodic, optical band-pass filter (OBPF) 20 selects spectral regions of multiple WDM channels, shifted off the channel centers, similar to the process of selecting off-centered spectral region of single channel regenerator discussed earlier. It should be understood by those skilled in the art that the present invention may also include a spectrally periodic, optical band-pass filter at the input 21 of the first unit section 15 of nonlinear medium (not depicted in FIG. 2A), for example, for filtering out the spontaneous emissions from the amplifier 21a. It should also be understood by those skilled in the art that N number of unit sections 15 of nonlinear media may be employed to satisfy given design criteria.

In order to leave sufficient space for the self-phase modulation (SPM)-broadened spectra without undue increase in complexity, the present invention incorporates the use of a 1:4 de-interleaver 22 at the regenerator 10 input 24. The de-interleaver 22 separates incoming WDM channels 12 into four sets, thus increasing channel spacing four-fold. The interleaver 23 recombines the four sets near the output 18. De-interleavers 22 are commonly used in transmission systems, particularly in optical add-drop multiplexers (OADMs) and receivers. Thus, the de-interleaver 22 can either be external to the regenerator 10 (if the regenerator is co-located with an OADM node), or be a part of the regenerator (for stand-alone regenerators).

Now referring to the group delay spectra 26 depicted in FIG. 2B, the regenerator 10 of the present invention features a group delay spectrum 28 of a unit section 15 of nonlinear medium, depicted in FIG. 2B as a thick solid line. The group delay spectrum 28 of a unit section 15 of nonlinear medium of the present invention maintains the dispersive walk-off among different spectral components of the same channel 30 (spectral regions representing three adjacent channels are denoted 30a, 30b and 30c) low enough to provide sufficient SPM-induced spectral broadening while preserving integrity of the pulses, and strongly suppresses nonlinear inter-channel interactions (FWM and XPM) by means of high dispersion accumulated between the channels 30. The unit section 15 of nonlinear medium, in accordance with the present invention, may be built using commercially available components, for example, HNLF 14 and PGDD 16 (i.e., by forming an HNLF/PGDD cell 15), as depicted in FIG. 2A. The periodic group delay spectrum 32, shown by the dashed line in FIG. 2B, is the primary feature of the PGDD 16 that enables fast bit walk-off between the neighboring channels 30 and has been shown, in different applications, to greatly enhance the quality of dispersion-managed-soliton transmission. Notably, PGDDs 16 may be built, for example, by using low-loss planar lightwave circuit technology, with a good match between the HNLF 14 and PGDD 16 mode sizes. Therefore, multiple PGDDs 16 can be integrated on silicon platforms with very little coupling loss to HNLFs 14 and, therefore, do not significantly contribute to the passive loss, cost, and physical dimensions of the regenerator 10. Note that the PGDD group delay spectrum 32 is exactly periodic versus frequency and approximately periodic versus wavelength.

FIG. 2B illustrates the group delay of one section of HNLF 14 as a dotted line 34. The concatenation or linking of a series of many HNLF-PGDD cells 15 leads to fast dispersion walk-off among the channels 30, while keeping the average intra-channel dispersion low.

EXAMPLE

Figure 3:
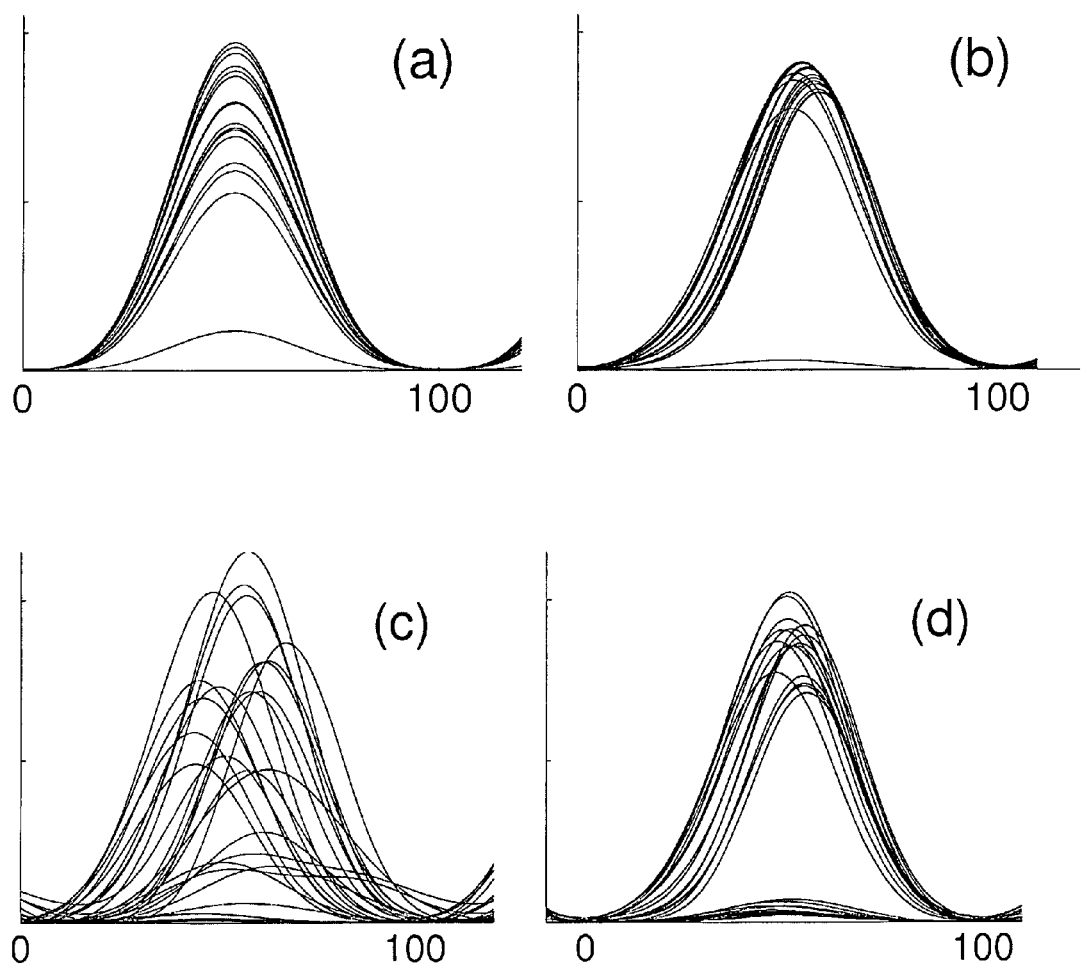
FIG. 3A is an optical eye diagram of the input.
FIG. 3B is an optical eye diagram of the output when only one channel is being processed.
FIG. 3C is an optical eye diagram of the regenerator where periodic group delay devices (PGDDs) have been replaced with fiber-based dispersion-compensating modules (DCMs) and where five channels are being processed.
FIG. 3D is an optical eye diagram with PGDDs where five channels are being processed.

FIG. 3 generally illustrates the results of simulating the regenerator 10 with one and five 10-Gb/s channels 30, each carrying a $2^5$-1 pseudo-random bit sequence (PRBS) of T=33-ps, chirp-free Gaussian pulses. FIGS. 3A and 3B show the optical eye diagram of the input 12 and output 18, respectively, of the regenerator 10 in a single-channel case. FIGS. 3C and 3D depict the worst-channel outputs for a five-channel input to the regenerator 10 at 10 Gb/s, where the dispersion compensation is performed by PGDD (FIG. 3D) and where the PGDD is replaced with a fiber based dispersion-compensating modules (DCM) (FIG. 3C).

Each HNLF 14 section of the regenerator 10 has the nonlinear constant $\gamma=9$ $W^{-1}$ $km^{-1}$ and the dispersion coefficient $D=-100$ ps/nm/km. In this example, the dispersion slope of the HNLF 14 was neglected and the length L of the HNLF 14 sections was set to 0.7 km and also in this example the fiber is assumed to be lossless. In most real devices, the uneven power profile over the length of the regenerator 10 can be countered by using HNLF sections with progressively smaller effective areas. Another method to reduce loss is to incorporate discrete or distributed optical amplifiers either within or between the HNLF-PGDD cells 15. A third method to counter the effect of loss is to use HNLF-PGDD cells 15 of progressively longer HNLF lengths and smaller absolute values of dispersion.

A linear and lossless DCM ($D_{DCM}$), which can be either a PGDD 16 (length $L_{DCM}$=0) or a conventional fiber-based device (e.g., SSMF-based), provides the path-average dispersion value $D_{ave}$=(DL+$D_{DCM}L_{DCM}$)/(L+$L_{DCM}$)=−1 ps/nm/km. The total HNLF 14 length in the regenerator 10 is 11.2 km (i.e., it has N=16 HNLF-DCM cells). The OBPF 20 at the output 17 of the regenerator 10 is taken as a 13.3-GHz Gaussian that is offset by 25 GHz from the channel center 31. In this example, the filter width was chosen to produce Gaussian pulses of the same duration as those at the input. The filters at the output of the transmitter and the input of the de-interleaver 22 are 3rd-order Gaussians with the full width at half maximum (FWHM) of 35 GHz (i.e., the filters are wide enough not to cause any noticeable distortion to the pulses and were assumed to have no chromatic dispersion).

The degradation of ONES is modeled by introducing amplitude jitter while the degradation of ZEROS is modeled by poor extinction ratio. The input pulses used have a 60-% peak-to-peak amplitude jitter and 8-dB extinction ratio, as shown in FIG. 3A. The average peak power of the input pulses is $P_0$=90 mW. The single-channel dispersion-managed regenerator 10 of the present invention significantly improves the quality of the optical eye, as illustrated in FIG. 3B.

FIGS. 3C and 3D illustrate the worst output channels 30 of the five-channel case (channel spacing of 200 GHz after de-interleaving 50-GHz-spaced channels) when the regenerator 10 uses a fiber-based DCM instead of the PGDD 16 (FIG. 3C) and a PGDD 16 (FIG. 3D), both having the same chromatic dispersions near the channels' centers 31. The channels 30 are co-polarized and their PRBS patterns are decorrelated (this models the worst practical case for inter-channel nonlinearities). To compare the improvement of the signal quality in FIG. 3D to that in FIG. 3A, the eye opening is measured within a 10-ps (i.e., 10% of the bit period) window around the eye's maximum, and the output signal 18 is rescaled to make the average powers of the input 12 and output 18 equal to each other. The corresponding eye opening increases from FIG. 3A to FIG. 3D by 1.5 dB, with improvements observed in both ONES and ZEROS. Comparing FIG. 3C (fully closed eye) and FIG. 3D proves that the PGDD 16 of the present invention is a key component of the regenerator 10.

The performance of the regenerator 10 of the present invention can be easily extended to other bit rates and pulse parameters by the following rescaling rules. The operation of the regenerator 10 is governed by seven dimensionless parameters: N, $S_{ave}$=$D_{ave}$κ, S=Dκ, G=γ$P_0$L, $\Delta\Omega_{OBPF}$=$\Delta\omega_{OBPF}$T, $\Delta\Omega$=$\Delta\omega$T, and pluse duty ratio d=T/$T_p$, where $κ=L\lambda^2/(2\pi cT^2)$, γ=nonlinear constant, $P_0$=average peak power of the input pulses, $\Delta\omega_{OBEF}$ is the offset of the OBPF's pass-band from the channel center 31, $\Delta\omega$ is the channel spacing, T is the pulse duration, $T_p$ is the pulse repetition period, λ is the wavelength and c is the speed of light. Thus, another transmission system can utilize the regenerator 10 and reach the same performance if the system parameters are scaled to preserve the dimensionless numbers.

It should be noted that, while commercial 10 Gb/s systems typically have 20-% spectral efficiency, other spectral efficiencies (such as 40-% spectral efficiency of typical 40-Gb/s systems) may not be accommodated by simple rescaling rules. Smaller spectral efficiencies will merely result in eliminating the need for the de-interleaver 22. On the other hand, accommodating higher spectral efficiencies is possible if requirements on the PGDD 16 are made stricter by, for example, requiring it to additionally perform gentle band-pass filtering (as illustrated by the thin line 36 in FIG. 2B) around the center of each channel 31. Fortunately, such a band-pass filtering functionality is often inherent to the PGDD 16. Alternatively, the same may be accomplished by inserting additional band-pass, spectrally-periodic filter after the PGDD 16 to optimize the shape of the amplitude transfer function. Using this approach, an 1.7-dB eye-opening improvement for commercial 40-Gb/s system with 40-% spectral efficiency has been numerically demonstrated. Thus, the regenerator 10 of the present invention provides all-optical regeneration of multiple WDM channels 12 for spectral efficiencies of up to 40%, with eye opening improvements of at least 1.5 dB.

Not only does the present invention increase, for example, bit-rate flexibility and thus enable the handling of multiple bit rates, the present invention is compatible with integrated-optics technologies. Thus, systems built in accordance with the present invention may be designed in ultra-compact sizes and mass produced economically. It should be understood by those skilled in the art that by choosing the appropriate modifications, the present invention's performance can approach the quantum limited performance of a matched transmitter/receiver pair.

Although preferred embodiments of an all-optical signal processor have been described in detail herein, it will be appreciated that the present invention provides many applicable inventive concepts that can be embodied in a wide variety of specific contexts. For example, while the description has principally referenced enabling simultaneous processing of multiple WDM channels 12 without demultiplexing, it should be understood that the present invention may also be utilized for a multitude of applications including those, for example, considered telecommunication applications.

It should also be understood, for example, that the unit sections 15 of non-linear medium of the present invention, which are immune to inter-channel interactions, may be used in other non-linear all-optical elements such as wavelength converters, optical limiters and time-division multiplexers. As another example, it should be understood that although the de-interleaver 22 and interleaver 23, e.g., discussed above are 1:4 and 4:1, respectively, various other de-interleavers (e.g., 1:3 and 1:6 de-interleavers and 3:1 and 6:1 interleavers) may be used. In addition, it should further be understood that the use of photonic-crystal-based materials, for example, can combine the properties of high nonlinearity and staircase-like group delay spectrum 28 of a unit section 15 of nonlinear medium while allowing, for example, building the entire regenerator 10 on a chip as small as a few square millimeters.

It should be further understood that even with minor modifications of parameters, such as when inverting the dispersion sign, concepts similar to those for a group delay spectrum 28 of a unit section 15 of nonlinear medium may be applied to other preferred embodiments of fiber-based regenerators. This, for example, includes the modifications that broaden and compress solitons in optical fiber and then gently filter them, thereby regenerating ONE symbols and typically requiring smaller signal powers than the schemes discussed above, because only small spectral broadening is required. If in addition the regenerator 10 contains several such compression/filtering sections with slightly shifted filter centers, then regeneration of ZERO symbols is also possible. Thus, the present invention also provides the effective nonlinear medium for multi-channel soliton regeneration that is immune to nonlinear inter-channel interactions.

It should still further be understood by those skilled in the art that the absolute value of the group delay of the unit section 15 of nonlinear medium (e.g., HNLF-PGDD cell) accumulated between the center frequencies of the adjacent channels (e.g., channels 30*a* and 30*b*) is substantially higher than the absolute value of the group delay accumulated between any two frequency components of either one of the adjacent channels, as depicted in FIG. 2B. In addition, it should also be understood that the absolute value of the group delay slope in picoseconds per nanometer in a portion of the region between the centers 31 of two adjacent channels (e.g., channels 30*a* and 30*b*) is substantially higher than the absolute value of the group delay slope in picoseconds per nanometer within the bandwidth of either of the same two adjacent channels, as also depicted in FIG. 2B. In accordance with the present invention, the absolute value of the group delay slope within this portion is preferably at least 10 times higher than that within the bandwidth of either channel. The present invention may also preferably have the absolute value of the group delay slope within this portion that is at least 100 times higher than that within the bandwidth of either of the adjacent channels. The present invention may also accommodate other group delay slopes not specifically disclosed herein.

The specific embodiments discussed herein are merely illustrative of specific ways to make and use the invention, and do not delimit the scope of the invention. Those skilled in the art will recognize that various substitutions and modifications may be made to the invention without departing from the scope and spirit of the appended claims.

What is claimed is:

1. An all-optical processor comprising:
    one or more input ports, wherein at least one input port is adapted to accept multiple wavelength-division-multiplexed (WDM) channels;
    two or more sections of nonlinear medium coupled to the one or more input ports, wherein each section of nonlinear medium comprises a section of highly non-linear material and one periodic group delay device (PGDD);
    wherein, in each section of nonlinear medium, a group delay is accumulated between center frequencies of adjacent WDM channels, an absolute value of the group delay accumulated between the center frequencies of the adjacent channels is substantially higher than an absolute value of a group delay accumulated between any two frequency components of either one of the adjacent channels,
    wherein, for each section of nonlinear medium, an absolute value of the group delay slope in picoseconds per nanometer in a portion of the region between center frequencies of two of the adjacent channels is substantially higher than an absolute value of a group delay slope in picoseconds per nanometer within a bandwidth of either of the same two adjacent channels; and
    one or more output ports coupled to the two or more sections of nonlinear medium, wherein at least one output port is adapted for simultaneous 2R regeneration of the multiple WDM channels, wherein 2R regeneration includes re-amplification and nonlinear-optical re-shaping, wherein at least one output port of the optical processor is adapted to substantially accumulate large amounts of intra-channel nonlinear-optical effects while suppressing nonlinear interactions among different WDM channels.

2. The all-optical processor of claim 1, wherein at least one nonlinear medium is adapted to provide spectral broadening of the channels while suppressing the interactions among the channels.

3. The all-optical processor of claim 1, wherein the section of highly nonlinear material is a highly nonlinear fiber (HNLF) with high normal dispersion.

4. The all-optical processor of claim 1, further comprising one or more de-interleaving devices at the input port, wherein at least one de-interleaving device is adapted to separate the multiple WDM channels into two or more sets of channels.

5. The all-optical processor of claim 4, wherein the de-interleaving device is a 1:4 de-interleaver.

6. The all-optical processor of claim 4, further comprising one or more interleaving devices at the output port, wherein at least one interleaving device is adapted to combine the two or more sets of channels into output WDM channels.

7. The all-optical processor of claim 6, wherein the interleaving device is a 4:1 interleaver.

8. The all-optical processor of claim 1 further comprising soliton self-reshaping.

9. The all-optical processor of claim 1, wherein the multiple WDM channels propagate in the same nonlinear medium.

10. The all-optical processor of claim 1, wherein simultaneous 2R regeneration comprises nonlinear propagation of the WDM channels in the same nonlinear medium.

11. An all-optical signal processor comprising:
    a nonlinear medium, wherein the nonlinear medium comprises two or more consecutive highly-nonlinear fiber (HNLF) sections each adapted to receive multiple WDM channels, and wherein the two or more consecutive HNLF sections each comprise a periodic-group delay device (PGDD); and
    one or more amplifiers adapted to receive the multiple WDM channels, wherein the all-optical signal processor is adapted to substantially accumulate large amounts of intra-channel nonlinear-optical effects while suppressing nonlinear interactions among different WDM channels; and
    one or more optical band-pass filters adapted to filter channels received from the nonlinear medium; and
    wherein, in the nonlinear medium, a group delay is accumulated between center frequencies of adjacent WDM channels, wherein an absolute value of the group delay accumulated between the center frequencies of the adjacent channels is substantially higher than an absolute value of a group delay accumulated between any two frequency components of either one of the adjacent channels,
    wherein, for the nonlinear medium, an absolute value of the group delay slope in picoseconds per nanometer in a portion of the region between center frequencies of two of the adjacent channels is substantially higher than an absolute value of a group delay slope in picoseconds per nanometer within a bandwidth of either of the same two adjacent channels.

12. The all-optical signal processor of claim 11, further comprising one or more optical band-pass filters adapted to filter channels received from the amplifiers.

13. The all-optical processor of claim 12, wherein the one or more optical band-pass filters are implemented using a comb filter.

14. The all-optical signal processor of claim 11, further comprising one or more optical band-pass filters adapted to filter channels received from the amplifier.

15. The all-optical signal processor of claim 11, further comprising one or more interleavers adapted to receive filtered channels from the one or more optical band-pass filters and further adapted to combine sets of WDM channels into an output.

16. The all-optical processor of claim 11, wherein the one or more optical band-pass filters are implemented using a comb filter.

17. A method of all-optical signal processing, comprising:
inputting multiple wavelength-division-multiplexed (WDM) channels into an all optical processor;
processing in a common nonlinear medium the multiple WDM channels;
passing the multiple WDM channels through two or more sections of the nonlinear medium,
wherein each section of the nonlinear medium comprises one or more sections of a highly-nonlinear material with high dispersion,
wherein each section of the nonlinear medium comprises one periodic-group delay device (PGDD);
wherein the all optical processor is adapted to substantially accumulate large amounts of intra-channel nonlinear-optical effects while suppressing nonlinear interactions among different WDM channels;
generating in each section of nonlinear medium a group delay accumulated between center frequencies of adjacent WDM channels, wherein an absolute value of the group delay accumulated between the center frequencies of the adjacent channels is substantially higher than an absolute value of the group delay accumulated between any two frequency components of either of the adjacent WDM channels; and
ensuring in each section of nonlinear medium that an absolute value of the group delay slope in picoseconds per nanometer in a portion of the region between the center frequencies of two of the adjacent WDM channels is substantially higher than an absolute value of the group delay slope in picoseconds per nanometer within a bandwidth of either of the same two adjacent WDM channels.

18. The method of claim 17, further comprising providing spectral broadening of the multiple WDM channels in the nonlinear medium while suppressing interactions among channels.

19. The method of claim 17, wherein more than two of the WDM channels are nonorthogonally polarized channels.

20. The method of claim 17, further comprising separating the multiple WDM channels into two or more sets of channels with a de-interleaving device.

21. The method of claim 20, wherein the de-interleaving device is a 1:4 de-interleaver.

22. The method of claim 17, further comprising combining sets of multiple WDM channels into an output signal with an interleaving device.

23. The method of claim 22, wherein the interleaving device is a 4:1 interleaver.

24. An all-optical processor comprising:
one or more input ports, wherein at least one input port is adapted to accept multiple wavelength-division-multiplexed (WDM) channels;
two or more sections of nonlinear medium coupled to the one or more input ports, wherein each section of nonlinear medium comprises one section of a highly nonlinear material with high dispersion and one periodic-group delay device (PGDD),
wherein, in each section of nonlinear medium, a group delay is accumulated between center frequencies of adjacent WDM channels, an absolute value of the group delay accumulated between the center frequencies of the adjacent WDM channels is substantially higher than an absolute value of a group delay accumulated between any two frequency components of either one of the adjacent WDM channels,
wherein, for each section of nonlinear medium, an absolute value of the group delay slope in picoseconds per nanometer in a portion of the region between center frequencies of two of the adjacent WDM channels is substantially higher than an absolute value of a group delay slope in picoseconds per nanometer within a bandwidth of either of the same two adjacent WDM channels; and
one or more output ports coupled to the two or more sections of nonlinear medium, wherein at least one output port is adapted for 2R regeneration of multiple WDM channels in the same nonlinear medium, wherein 2R regeneration includes re-amplification and non-linear optical re-shaping, wherein at least one output port of the all optical processor it adapted to substantially accumulate large amounts of self phase modulation (SPM) while suppressing cross phase modulation (XPM) and four wave mixing (FWM) of the multiple WDM channels.

* * * * *